United States Patent
Yugami

(10) Patent No.: US 7,343,151 B2
(45) Date of Patent: Mar. 11, 2008

(54) CELLULAR PHONE HAVING MAIL AND SCHEDULE FUNCTIONS

(75) Inventor: Kazuyuki Yugami, Tokyo (JP)

(73) Assignee: NEC Corporation, Minato-ku, Tokyo (JP)

(*) Notice: Subject to any disclaimer, the term of this patent is extended or adjusted under 35 U.S.C. 154(b) by 253 days.

(21) Appl. No.: 10/884,446

(22) Filed: Jul. 2, 2004

(65) Prior Publication Data
US 2005/0003800 A1    Jan. 6, 2005

(30) Foreign Application Priority Data
Jul. 4, 2003    (JP)    ............... 2003-271107

(51) Int. Cl.
H04M 11/10    (2006.01)
H04M 1/64    (2006.01)
H04Q 7/20    (2006.01)

(52) U.S. Cl. ............... 455/413; 455/466; 379/88.1
(58) Field of Classification Search ............ 455/412.1, 455/412.2, 567, 407, 414.4, 466, 412, 413; 379/88.17; 709/206; 358/1.15
See application file for complete search history.

(56) References Cited

U.S. PATENT DOCUMENTS

| | | | | |
|---|---|---|---|---|
| 6,836,652 B2 * | 12/2004 | Arima et al. | ............... | 455/407 |
| 6,928,307 B2 * | 8/2005 | Ohtsuki | ............... | 455/567 |
| 6,980,798 B2 * | 12/2005 | Kido | ............... | 455/412.1 |
| 2001/0049725 A1 * | 12/2001 | Kosuge | ............... | 709/206 |
| 2002/0090069 A1 * | 7/2002 | Yaker | ............... | 379/88.17 |
| 2002/0099776 A1 | 7/2002 | Cafarella et al. | | |
| 2002/0154746 A1 | 10/2002 | Usami | | |
| 2003/0064715 A1 * | 4/2003 | Sugane | ............... | 455/414.4 |
| 2003/0110226 A1 * | 6/2003 | Inoue et al. | ............... | 709/206 |
| 2004/0203947 A1 * | 10/2004 | Moles | ............... | 455/466 |

FOREIGN PATENT DOCUMENTS

| | | |
|---|---|---|
| JP | 8-331621 | 12/1996 |
| JP | 2002-51378 | 2/2002 |
| JP | 2002-269214 | 9/2002 |
| JP | 2002-288394 | 10/2002 |

* cited by examiner

Primary Examiner—Joseph Feild
Assistant Examiner—Kiet Doan
(74) Attorney, Agent, or Firm—Muirhead and Saturnelli, LLC

(57) ABSTRACT

A cellular phone which is capable of receiving/transmitting an e-mail detects whether or not the e-mail received includes a predetermined e-mail allotted to an inquiry sent from a sender prior to a telephone call. Responsive to the predetermined e-mail, the cellular phone automatically sends the sender a state e-mail which is indicative of a state of the cellular phone. The state of the cellular phone may specify whether or not the cellular phone is put into a receivable state of the telephone call. Responsive to the state e-mail, the sender may make a telephone call to the cellular phone with reference to the state of the cellular phone. The predetermined e-mail may include a predetermined password known by an exclusive number of persons while the state e-mail may be sent in consideration of schedule information stored in the cellular phone.

15 Claims, 2 Drawing Sheets

CELLULAR PHONE HAVING MAIL AND SCHEDULE FUNCTIONS

BACKGROUND OF THE INVENTION

1. Field of the Invention

The present invention relates to a cellular phone which has an electronic mail transmission/reception function and a schedule registration function and to a method of using the cellular phone.

2. Description of the Related Art

A cellular phone has been widely used in various situations which includes a specific situation such that a bearer or a holder of the cellular phone can not immediately respond to an incoming call to talk to a sender or caller. Practically, using the cellular phone is often restrained, for example, during a meeting, boarding of public transportation, and seeing of movies in a movie theater. In order to cope with this restraint, a message recording and answering service (simply called an answering service) is well known in the art as a cellular phone service. With this cellular phone service, a sender's voice is recorded as a message in a receiver's cellular phone which is subject to the above-mentioned answering service and the receiver can reproduce the sender's voice later to know who the sender is and what he/she is requested.

However, the sender's request or errand can rarely be accomplished only when the sender's message is recorded/left in the receiver's cellular phone in one-way communication alone. Therefore, the sender leaves a message of requesting the receiver to call back to the sender in many cases. Under the circumstances, the receiver should very often call back to the sender in accordance with the recorded message left in the receiver's cellular phone. Otherwise, the sender should call back to the receiver again.

At any rate, the sender can not know the reason why no response can be received from the receiver and also can not judge when next calling should be made. Therefore, the sender sometimes makes many calls, or loses a chance to make a contact with the receiver.

When the receiver is subjected to the answering service, the sender of the phone call pays a charge for the phone call, in spite of the fact that any practical communication cannot be made.

Recent cellular phones have been generally equipped with a computer or a micro processor so as to transmit/receive electronic mails (often abbreviated to e-mails) and to process various information. Such a cellular phones is exemplified in Document 1 (Japanese Unexamined Patent Publication No. 2002-51378). The cellular phone disclosed in Document D1 can automatically send an e-mail to a sender or a receiver of a phone call by the use of the e-mail function, after no response can be obtained from the receiver. Such an e-mail includes a predetermined message. Another cellular phone is described in Document 2 (Japanese Unexamined Patent Publication No. Hei 8-331621) which is linked with a schedule registration function installed in the cellular phone. Specifically, the cellular phone disclosed in Document D2 receives an incoming call and/or an incoming e-mail and automatically transmits, from a receiver, a message peculiar to the incoming call or e-mail when the receiver cannot respond to the incoming call or e-mail. In this event, such a peculiar message may be related to a receiver's schedule installed in the receivers cellular phone and may indicate that the receiver is in a meeting or the like.

Moreover, related arts are also disclosed in Documents 3 and 4 (Japanese Unexamined Patent Publication Nos. 2002-269214 and 2002-288394). In Documents D3 and D4, schedule management systems have been proposed which use cellular phones or portable terminals, such as PDA (Personal Digital Assistance). In these systems, not only a system owner but also a business manager and the like can refer to the schedule through a network by using the cellular phones and/or the portable terminals.

Herein, it is to be noted in Documents 1 and 2 that, when a sender makes a telephone call to a receiver subjected to the answering service and the receiver cannot make any response to the telephone call, there is a problem that an unnecessary charge for the telephone call is imposed on the sender. In addition, the sender cannot know when the receiver can make a response, and therefore eventually repeats calling to the receiver many times. Otherwise, the sender might not communicate with the receiver.

On the other hand, using the schedule management system described in Documents 3 and 4 may make it possible to refer to a schedule of a receiver from the sender and to predict a time when the receiver can make a response. However, the schedule management system needs a control system that is constituted separately from the cellular phone system. Thus, a user has to separately make access to the control system. Taking protection of secrecy or privacy into consideration, the schedule management system can not be easily used in a case other than a limited case where the schedule management system is used between a business supervisor and a subordinate during a business hour.

SUMMARY OF THE INVENTION

It is an object of the present invention to provide a cellular phone capable of automatically informing a sender of a response time or a state of a receiver.

It is another object of the present invention to provide a cellular phone of the type described, wherein a schedule of the receiver can be also easily transmitted from the receiver to the transmitter.

It is yet another object of the present invention to provide a method of simply notifying the sender of the state concerned with the receiver.

To achieve the above-described object, according to a first aspect of the present invention, there is provided a cellular phone having an electronic mail (abbreviated to e-mail hereinafter) transmission/reception function.

Specifically, the cellular phone device comprises first means for judging whether or not the e-mail received includes a predetermined e-mail allotted to an inquiry concerned with a state of the cellular phone device and second means for automatically transmitting, as the e-mail, a state response e-mail indicative of the state of the cellular phone when the predetermined e-mail is received.

According to a second aspect of the present invention, the predetermined e-mail includes a password assigned to specific persons only and the first means comprises receiving means for receiving the e-mail, detecting means for detecting whether or not the password is included in the received e-mail, and first judging means for judging that the received e-mail is the predetermined e-mail when the password is detected in the received e-mail.

According to a third aspect of the present invention, the second means comprises second judging means for judging whether or not the cellular phone device is put in an receivable state of receiving an incoming telephone call and transmitting means for transmitting the state response e-mail in response to the predetermined e-mail.

According to a fourth aspect of the present invention, the cellular phone device further comprises a storage for storing schedule information. In this event, the second judging means comprises accessing means for accessing the storage to refer to the schedule information when the predetermined e-mail is received and deciding means for deciding whether or not the cellular phone device is put into the receivable state on the basis of the schedule information.

According to a fifth aspect of the present invention, the deciding means comprises a first section for searching the schedule information so as to investigate the schedule information at a current time of receiving the predetermined e-mail and a second section for deciding the receivable state of the cellular phone when the schedule information is representative of the receivable state of the incoming telephone at the current time. The transmitting means transmits the state response e-mail representative of the receivable state while the transmitting means transmits the state response e-mail representative of a non-receivable state at the current time.

According to a sixth aspect of the present invention, the state response e-mail which is representative of the non-receivable state includes message information indicative of a non-receivable state together with time information at which the cellular phone device is put into the receivable state.

According to a seventh aspect of the present invention, the predetermined e-mail includes a mail address assigned to a sender and the first means comprises receiving means for receiving the e-mail, means for detecting whether or not the mail address of the received e-mail is registered in the cellular phone device, and first judging means for judging that the received e-mail is the predetermined e-mail when the mail address is registered in the cellular phone device.

According to an eighth aspect of the present invention, the second means comprises second judging means for judging whether or not the cellular phone device is put in an receivable state of receiving an incoming telephone call and transmitting means for transmitting the state response e-mail in response to the predetermined e-mail.

According to a ninth aspect of the present invention, the cellular phone device further comprises a storage for storing schedule information. The second judging means comprises accessing means for accessing the storage to refer to the schedule information when the predetermined e-mail is received and deciding means for deciding whether or not the cellular phone device is put into the receivable state on the basis of the schedule information.

According to a tenth aspect of the present invention, the deciding means comprises a first section for searching the schedule information so as to investigate the schedule information at a current time of receiving the predetermined e-mail and a second section for deciding the receivable state of the cellular phone when the schedule information is representative of the receivable state of the incoming telephone at the current time.

The transmitting means transmits the state response e-mail representative of the receivable state while the transmitting means transmits the state response e-mail representative of a non-receivable state at the current time.

According to an eleventh aspect of the present invention, the state response e-mail which is representative of the non-receivable state includes message information indicative of a non-receivable state together with time information at which the cellular phone device becomes put into the receivable state.

According to a twelfth aspect of the present invention, a program is equipped with a cellular phone having an e-mail transmission/reception function and a schedule registration function. The program allows a computer to execute a whole operation and comprising the steps of judging whether or not the e-mail received includes a predetermined e-mail allotted to an inquiry concerned with a state of the cellular phone device and automatically transmitting, as the e-mail, a state response e-mail indicative of the state of the cellular phone when the predetermined e-mail is received.

According to a thirteenth aspect of the present invention, the predetermined e-mail includes a password assigned to specific persons only. The program further comprises the steps of receiving the e-mail, detecting whether or not the password is included in the received e-mail, and judging that the received e-mail is the predetermined e-mail when the password is detected in the received 3-mail.

According to a fourteenth aspect of the present invention, the predetermined e-mail includes a mail address assigned to a sender. The program further comprises the steps of receiving the e-mail, detecting whether or not the mail address of the received e-mail is registered in the cellular phone device and judging that the received e-mail is the predetermined e-mail when the mail address is registered in the cellular phone device.

According to a fifteenth aspect of the present invention, a method is for use in making a telephone call from a sender to a receiver and comprises the steps of sending a predetermined e-mail from the sender to the receiver prior to the telephone call, detecting the predetermined e-mail at the receiver, and automatically transmitting, from the receiver to the sender, a state response e-mail representative of whether or not the receiver is put into a receivable state of the telephone call.

According to a sixteenth aspect of the present invention, the method further comprises the step of making the telephone call from the sender when the receivable state is confirmed after the state response e-mail is received.

According to a seventeenth aspect of the present invention, the predetermined e-mail is specified by either a password allotted to specific persons or an e-mail address registered and allowed by the receiver.

DESCRIPTION OF THE PREFERRED EMBODIMENT

An embodiment of the present invention will be described hereinafter in detail with reference to the drawings.

Figure 1:
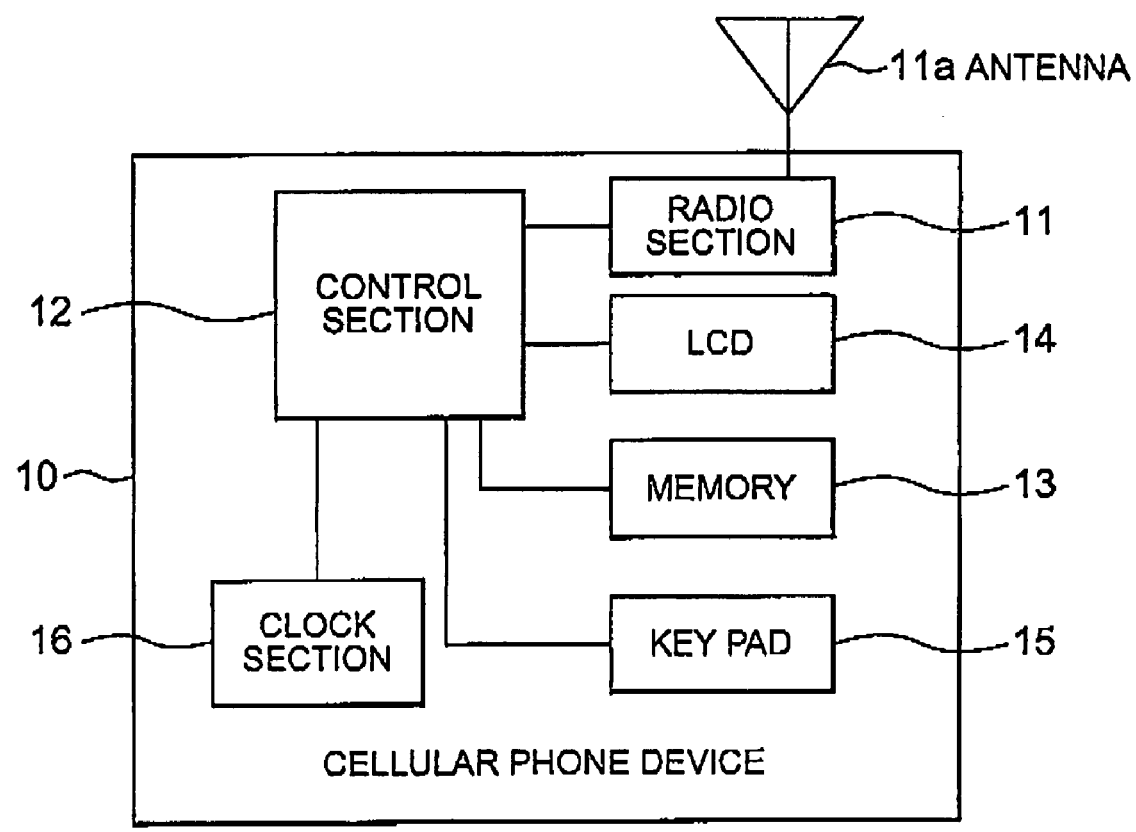
FIG. 1 is a block diagram for use in describing a constitution of a cellular phone device of an embodiment of the present invention.

FIG. 1 is a block diagram showing a constitution of a cellular phone device 10 according to the present embodiment.

The illustrated cellular phone device 10 is equipped with various information processing functions, such as an electronic mail transmission/reception function and a schedule registration function in addition to a call function, and accordingly performs various types of information processing. The cellular phone device 10 also has a control section 12 comprising a computer which generally controls operations of sections connected to the computer and which controls transmission, reception, call, wait, display and the like. The control section 12 is connected to a radio section 11, an LCD 14, a key pad 15, a clock section 16, a memory 13 and the like. The memory 13 stores a program for controlling other parts and realizing the above-mentioned functions and also serves to store information, such as e-mails and addresses. To this end, the illustrated memory 13 has a program area for storing the program and a data area for storing the information. Specifically, the control section 12 execute various operations in accordance with the program stored in the memory 13. The illustrated memory 13 stores information such as transmission history, reception history, received mails, and various passwords. Data such as a phone number and a mail address in accordance with a phone book function, schedule information in accordance with the schedule registration function and the like are also stored in the memory 13.

The radio section 11 is operable to transmit/receive a radio signal via an antenna 11a. The LCD 14 is capable of displaying various information, such as contents of e-mails and schedule information corresponding to the schedule registration function. The key pad 15 is used by a user in inputting various information.

Herein, it is to be noted in FIG. 1 that the cellular phone device 10 according to the present embodiment has a function of transmitting a predetermined e-mail prior to making a telephone call or a voice call. Such a predetermined e-mail carries a message representative of a preliminary notice concerned with the subsequent telephone call when the telephone call is generated as an outgoing call. Moreover, the cellular phone device 10 is operable in response to the above-mentioned predetermined e-mail and automatically returns information indicative of a present state of the cellular phone device 10 back to the sender when the predetermined e-mail is received from the sender. The present state specified by the returned information represent whether or not the cellular phone device 11 is put into a communicable state. The present state is sent from the receiver to the sender in the form of an e-mail which is automatically transmitted in response to the predetermined e-mail and which may be called a state e-mail representative of a state in the receiver. The above-mentioned operation of the illustrated cellular phone device will be referred to as an automatic returning operation or service.

Next, an operation of the cellular phone device 10 according to the present embodiment will be described with reference to FIG. 2 along with FIG. 1.

The cellular phone device 10 according to the present embodiment is operable in response to the predetermined e-mail mentioned above. In FIG. 1, it is assumed that the predetermined e-mail includes a preset password which is peculiar to an inquiry and which is representative of whether or not an incoming call (namely, incoming telephone call) is received by the cellular phone device 10. Such preset information is also assumed to be announced to user's or bearer's acquaintances, family, and so on who would be very often called by the bearer and who therefore know about the predetermined e-mail with the password. As a result, they can utilize the automatic returning service according to the present invention so as to receive a present state from a receiver. The present state of the receiver is automatically transmitted from the receiver as a state response e-mail indicative of whether or not the receiver is put into a receivable state. When the password included in the predetermined e-mail is known by a restricted number of people, the automatic returning service can be used only by the restricted number of people and can avoid misuse or abuse of the automatic returning service.

Figure 2:
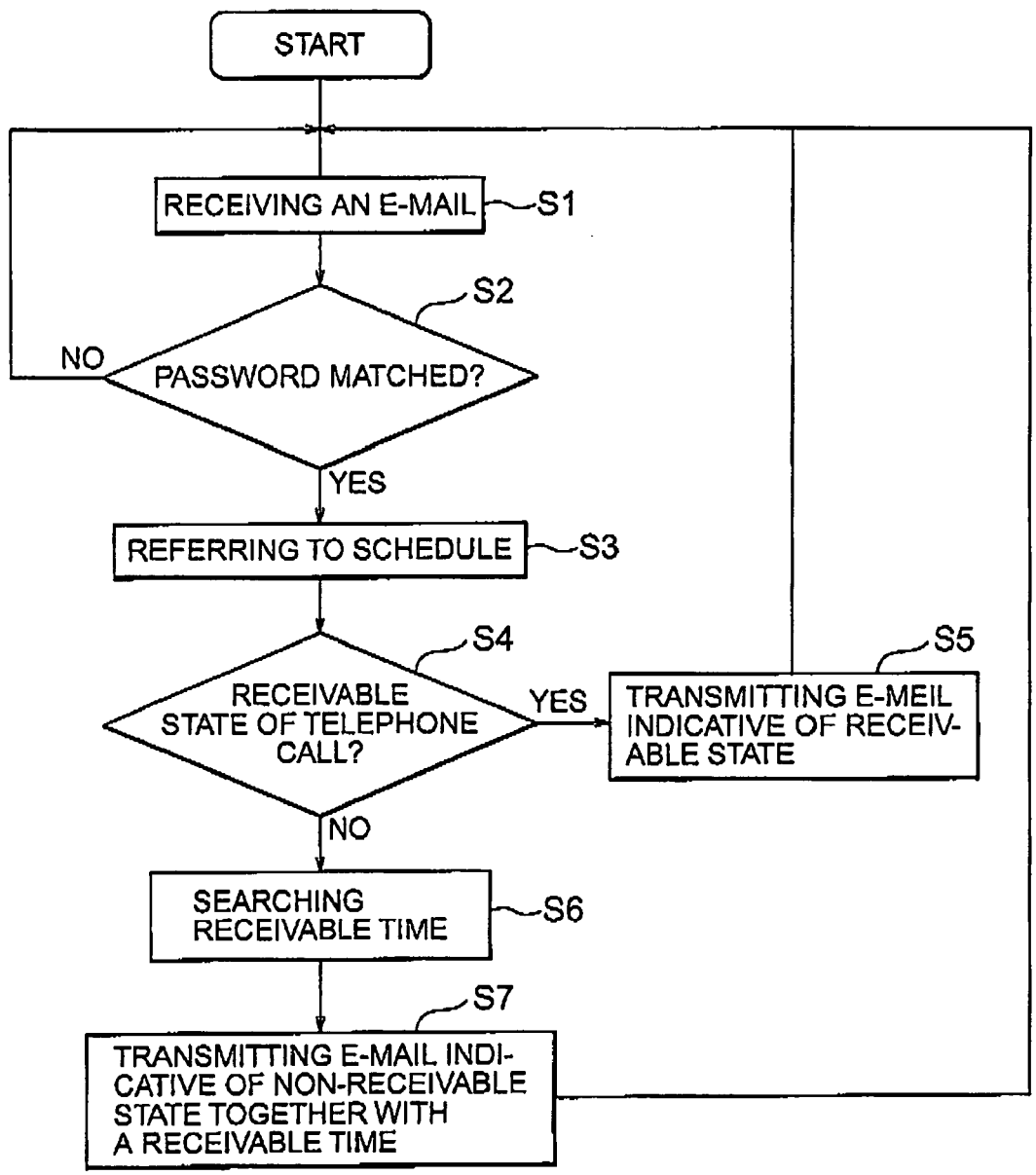
FIG. 2 is a flowchart of an operation of the cellular phone device of FIG. 1 according to the present invention.

At first, an e-mail is preliminarily transmitted from a sender prior to a telephone or voice call and is received at a step S1 of FIG. 2 by the cellular phone device 10 mentioned in FIG. 1. The step S1 is followed by a step S2 at which the control section 12 judges whether or not the received e-mail includes the password stored beforehand.

Since the password is known only by the restricted number of persons, as mentioned before, specific persons alone can use the automatic returning function of indicating whether or the receiver can respond to the predetermined e-mail. Otherwise, the automatic returning function is not available.

Next, when the control section 12 judges at the step S2 that the password is matched with a stored password in the cellular phone device, the control section 12 detects and decides that the predetermined e-mail is received which inquires whether or not the receiver is put into a receivable state. With this structure, both the steps S1 and S2 may collectively serve to judge whether or not the received e-mail includes the predetermined e-mail and may be implemented by a first unit which may be hardware or software. In addition, the second step S2 serves to judge whether or not the password is included in the received e-mail to detect the predetermined e-mail and may be referred to as a first judging step or unit.

When detection is made at the step S2 about reception of the predetermined e-mail, the memory 13 is accessed by the control section 12 so as to read schedule information out of the memory 13 (step S3). The control section 12 judges whether or not an incoming telephone call can be received by the receiver by collating the schedule information with a current time read from the clock section 16 (step S4). Specifically, when a meeting is registered as the schedule information at the current time, the control section judges at the step S4 that any response to the incoming call is Impossible. When any schedule is not registered, it is judged by the control section 12 that the subsequent incoming call would be received or a response is possible in response to the incoming call.

Moreover, when the control section 12 judges or decides at the step S4 that the cellular phone device 10 is put into the receivable state of the incoming telephone call and, as a result, the response is possible in response to the incoming telephone call, the step S4 is succeeded by a step S5 at which an e-mail is automatically transmitted to the sender so as to indicate that the incoming call can be received by the receiver. Thereafter, the step S5 is returned back to the step S1 at which the cellular phone device is being in a standby state of receiving an e-mail. The e-mail transmitted at the step S5 may include a message which is indicative of a receivable state of an incoming telephone call and which may be previously stored or registered in the memory 13.

Responsive to the e-mail mentioned above, the sender can make a telephone call to the receiver's cellular phone device 10 without any problem because confirmation has already been made in advance about the fact that the receiver is not put into a receivable state by the use of the transmission/reception of the e-mails.

On the other hand, when the control section 12 judges at the step S4 that the incoming call is not receivable by the cellular phone device 10, the step S4 is followed by a step S6 at which the memory 13 is accessed to read or investigate the schedule information out of the memory 13. Thereafter, the control section 12 judges a receivable time of a telephone call in the receiver's cellular phone device 10 on the basis of the schedule information. More specifically, it is assumed that a meeting lasting from two till four o'clock is registered in the schedule and no schedule is registered until five o'clock. When the present time is three o'clock, the control section 12 judges that a receivable period of an incoming telephone call is between four o'clock and five o'clock. In this event, the control section 12 sends the sender a message, for example, "I cannot answer the phone now. Please make a call between four and five o'clock." (step S7). Such a message is automatically sent to the sender as a state response e-mail. Responsive to the state response e-mail, the sender can know when to make a call from the returned state response e-mail.

At any rate, the steps S3 to S7 serve to automatically transmit the state response e-mail indicative of the state of the cellular phone device 10 when the predetermined e-mail is received and will be referred to as a second unit or state implemented by hardware or software. In this event, the step S4 may be called a second judging step of judging whether or not the cellular phone device 10 is put into the receivable state of the incoming telephone call while the step S5 and S7 may be called a transmitting unit or stage for transmitting the state response e-mail back to the sender.

In this manner, according to the present embodiment, the predetermined e-mail is sent from a sender before a telephone call the in advance to inquire or make sure that the state of the receiver's cellular phone device 10 is put in the receivable state. As a result, the sender can know whether or not a receiver is put in a receivable state of the telephone call before the telephone call. Therefore, no charge is imposed on the sender due to unnecessary telephone call. When the receiver's cellular phone device 10 is not put into the receivable state of the telephone call, the sender can know the time when the telephone call is made in response to the state e-mail returned from the receiver's cellular phone device 10. Therefore, the sender can make a phone call at an appropriate time to substantially securely talk, and can be prevented from making a call-back many times or losing a chance to make a phone contact.

The present embodiment mentioned above exemplifies the case where the predetermined e-mail including the password is transmitted from the sender to the receiver's cellular phone device 10 so as to inquire whether or not the receiver's cellular phone device 10 is put into the receivable state and accordingly the specific persons alone can exclusively inquire the receivable state of the receiver's cellular phone device 10.

Alternatively, a receiver or a bearer can may set, in the receiver's cellular phone device 10, mail addresses of persons who are allowed to inquire the receivable state of the receiver, In the setting of each e-mail address, for example, each mail address can be registered or set in accordance with a directory function. Such setting of each e-mail address can be accomplished by allotting an admission to e-mail addresses that are previously stored in the memory 13 and that can be accessed by using the predetermined e-mail. This setting is very simple for each user or bearer of the cellular phone device 10 and is advantageous in that each sender may not input any password when the sender inquires a receivable state of a receiver's cellular phone device 10 by transmitting the predetermined e-mail. This facilitates an operation on transmitting the predetermined e-mail from the sender. In this event, the predetermined e-mail can be distinguished from any other e-mails by including a predetermined key word allotted to the predetermined e-mail which serves as an inquiry e-mail. Such a predetermined key word for the predetermined e-mail may be, for example, "inquiry of a receivable state".

Moreover, when the cellular phone device 10 is put into a non-receivable state of the telephone call, the returned state e-mail may include reason information indicative of a reason why the cellular phone device 10 can not receive the telephone call. As such information, schedule information which is registered or stored in the memory 13 can be used. Alternatively, content information of the registered schedule may be used as such. On the other hand, when categories as "work", "move", and "private" can be set to the schedule to be registered, and the information of the category may be used. As the message included in the return mail, instead of using the contents as such, a desired message may be registered in each content, and the registered message may also be transmitted. Persons to whom the mail is returned are divided into groups of coworkers, supervisors, clients, family members and the like, and various messages may be registered in accordance with the group, or an-mail which does not include the such reason information may be transmitted to the persons of a specific group.

The cellular phone device 10 may be used as a sender's cellular phone device, although the above-description has been restricted to the case where the device 10 is used as the receiver's cellular phone device. In this case, the cellular phone device 10 has the memory 13 for storing inquiry or predetermined information indicative of an inquiry and a transmitting circuit for transmitting the inquiry information as the predetermined e-mail under control of the control section 12.

While the present Invention has thus far been described in conjunction with a preferred embodiment thereof, it will readily be possible for those skilled in the art to put the present invention into practice in various other manners. For example, the present invention may be also specified by a method of preliminarily sending an inquiry or predetermined e-mail from a sender to a receiver prior to a telephone call that would be made by the sender and transmitting, from the receiver to the sender, a state e-mail indicative of a state of the receiver. After reception of the state e-mail, the sender makes a telephone call to the receiver. Accordingly, schedule information may not always be referred to in the receiver to transmit the state e-mail from the receiver to the sender. The memory 13 stores the program for making the control section 12 execute the above-mentioned method.

What is claimed is:

1. A cellular phone device capable of receiving/transmitting an e-mail comprising:
   first means for judging whether or not the e-mail received includes a predetermined e-mail allotted to an inquiry concerned with a state of the cellular phone and
   second means for automatically transmitting a state response e-mail indicative of the state of the cellular phone device when the predetermined e-mail is received, wherein said second means generates time period information that identifies a time period for placement of an in-bound telephone call to said cellular phone device and includes said time period information in said state response e-mail in response to said predetermined e-mail;
   further comprising:
   out-bound call query transmitting means for transmitting a second predetermined e-mail to another cellular phone device prior to initiation of an out-bound telephone call to said another cellular phone device: and out-bound call query receiving means for receiving a second state response e-mail from said another cellular Phone device that is sent in response to said second predetermined e-mail.

2. A cellular phone device as claimed in claim 1, wherein the predetermined e-mail includes a password assigned to specific persons only and the first means comprises:
   receiving means for receiving the e-mail;
   detecting means for detecting whether or not the password is included in the received e-mail; and
   first judging means for judging that the received e-mail is the predetermined e-mail when the password is detected in the received e-mail.

3. A cellular phone device as claimed in claim 2, wherein the second means comprises:
   second judging means for judging whether or not the cellular phone device is put in an receivable state of receiving an incoming telephone call; and
   transmitting means for transmitting the state response e-mail in response to the predetermined e-mail.

4. A cellular phone device as claimed in claim 3, further comprising a storage for storing schedule information, wherein the second judging means comprises:
   accessing means for accessing the storage to refer to the schedule information when the predetermined e-mail is received; and
   deciding means for deciding whether or not the cellular phone device is put into the receivable state on the basis of the schedule information.

5. A cellular phone device as claimed in claim 4, wherein the deciding means comprises:
   a first section for searching the schedule information so as to investigate the schedule information at a current time of receiving the predetermined e-mail; and
   a second section for deciding the receivable state of the cellular phone when the schedule information is representative of the receivable state of the incoming telephone at the current time;
   the transmitting means transmitting the state response e-mail representative of the receivable state while the transmitting means transmits the state response e-mail representative of a non-receivable state at the current time.

6. A cellular phone device as claimed in claim 5, wherein the state response e-mail which is representative of the non-receivable state includes message information indicative of a non-receivable state together with time information at which the cellular phone device is put into the receivable state.

7. A cellular phone device as claimed in claim 1, wherein the predetermined e-mail includes a mail address assigned to a sender and the first means comprises:
   receiving means for receiving the e-mail; and
   means for detecting whether or not the mail address of the received e-mail is registered in the cellular phone device; and
   first judging means for judging that the received e-mail is the predetermined e-mail when the mail address is registered in the cellular phone device.

8. A cellular phone device as claimed in claim 7, wherein the second means comprises:
   second judging means for judging whether or not the cellular phone device is put in an receivable state of receiving an incoming telephone call; and
   transmitting means for transmitting the state response e-mail in response to the predetermined e-mail.

9. A cellular phone device as claimed in claim 8, further comprising a storage for storing schedule information, wherein the second judging means comprises:
   accessing means for accessing the storage to refer to the schedule information when the predetermined e-mail is received; and
   deciding means for deciding whether or not the cellular phone device is put into the receivable state on the basis of the schedule information.

10. A cellular phone device as claimed in claim 9, wherein the deciding means comprises:
    a first section for searching the schedule information so as to investigate the schedule information at a current time of receiving the predetermined e-mail; and
    a second section for deciding the receivable state of the cellular phone when the schedule information is representative of the receivable state of the incoming telephone at the current time;
    the transmitting means transmitting the state response e-mail representative of the receivable state while the transmitting means transmits the state response e-mail representative of a non-receivable state at the current time.

11. A cellular phone device as claimed in claim 10, wherein the state response e-mail which is representative of the non-receivable state includes message information indicative of a non-receivable state together with time information at which the cellular phone device becomes put into the receivable state.

12. Computer readable medium encoded with a computer program equipped with a cellular phone having an e-mail transmission/reception function and a schedule registration function, the program allowing a computer to execute a whole operation and comprising the steps of:
    judging whether or not the e-mail received includes a predetermined e-mail allotted to an inquiry concerned with a state of the cellular phone device; and
    automatically transmitting a state response e-mail indicative of the state of the cellular phone when the predetermined e-mail is received, wherein time period information is generated that identifies a time period for placement of an in-bound telephone call to said cellular phone and wherein said time period information is included in said state response e-mail in response to said predetermined e-mail;
    further comprising:
    transmitting a second predetermined e-mail to another cellular phone device prior to initiation of an out-bound telephone call to said another cellular phone device; and
    receiving a second state response e-mail from said another cellular phone device that is sent in response to said predetermined e-mail.

13. A program as claimed in claim 12, wherein the predetermined e-mail includes a password assigned to specific persons only;
    the program further comprising the steps of:
    receiving the e-mail;
    detecting whether or not the password is included in the received e-mail; and
    judging that the received e-mail is the predetermined e-mail when the password is detected in the received e-mail.

14. A program as claimed in claim 12, wherein the predetermined e-mail includes a mail address assigned to a sender; the program further comprising the steps of:
    receiving the e-mail;

detecting whether or not the mail address of the received e-mail is registered in the cellular phone device; and judging that the received e-mail is the predetermined e-mail when the mail address is registered in the cellular phone device.

15. A method of making a telephone call from a sender to a receiver, comprising the steps of:

sending a predetermined e-mail from the sender to the receiver prior to the telephone call;

detecting the predetermined e-mail at the receiver; and automatically transmitting, from the receiver to the sender, a state response e-mail representative of whether or not the receiver is put into a receivable state of the telephone call, wherein time period information is generated that identifies a time period for placement of an in-bound telephone call to said cellular phone device and wherein said time period information is included in said state response e-mail in response to said predetermined e-mail;

further comprising the step of:

making the telephone call from the sender when the receivable state is confirmed after the state response e-mail is received, wherein the predetermined e-mail is specified by either a password allotted to specific persons or an e-mail address registered and allowed by the receiver.

* * * * *